(12) United States Patent
Donnan et al.

(10) Patent No.: US 9,499,180 B2
(45) Date of Patent: Nov. 22, 2016

(54) LOCOMOTIVE HEADLAMP

(71) Applicants: Railhead Corporation, Alsip, IL (US); Daniel Messer, Cole St. Luc, Montreal (CA)

(72) Inventors: Joseph Donnan, Oak Lawn, IL (US); Daniel Messer, Cole St. Luc (CA)

( * ) Notice: Subject to any disclaimer, the term of this patent is extended or adjusted under 35 U.S.C. 154(b) by 50 days.

(21) Appl. No.: 14/740,441

(22) Filed: Jun. 16, 2015

(65) Prior Publication Data

US 2015/0367865 A1 Dec. 24, 2015

Related U.S. Application Data

(60) Provisional application No. 62/014,896, filed on Jun. 20, 2014.

(51) Int. Cl.
| | |
|---|---|
| *B61D 27/00* | (2006.01) |
| *B61D 29/00* | (2006.01) |
| *F21S 8/10* | (2006.01) |
| *F21Y 101/00* | (2016.01) |

(52) U.S. Cl.
CPC ............ *B61D 29/00* (2013.01); *F21S 48/1154* (2013.01); *F21S 48/328* (2013.01); *F21Y 2101/00* (2013.01); *F21Y 2105/10* (2016.08); *F21Y 2115/10* (2016.08)

(58) Field of Classification Search
CPC ... F21S 48/1154; F21S 48/328; F21V 29/70; F21V 29/71; F21V 29/713; F21V 29/717; F21V 29/73; F21V 29/74; F21V 29/745; F21Y 2101/02; B61L 15/02; B61L 2207/02; B61D 29/00
See application file for complete search history.

(56) References Cited

U.S. PATENT DOCUMENTS

| | | | |
|---|---|---|---|
| 8,931,938 B2 * | 1/2015 | Kay | ........................ B61D 29/00 362/247 |
| 2016/0040832 A1 * | 2/2016 | Sakagami | ................ F21K 9/50 362/311.02 |

* cited by examiner

*Primary Examiner* — Robert May
(74) *Attorney, Agent, or Firm* — Doherty, Wallace, Pillsbury & Murphy, P.C.

(57) ABSTRACT

A locomotive headlamp comprising one or more light emitting diode ("LED") bulbs, wherein the headlamp is ideally suited for reducing the parasitic load of the locomotive by up to about 86 percent, and which is designed and installed in a locomotive's headlight housing to cause the heat generated by the one or more LED bulbs to prevent snow and ice impaction around the locomotive headlamp, and to prevent damage to the electronics and/or circuitry used to operate the one more LED bulbs from the locomotive's power source.

14 Claims, 14 Drawing Sheets

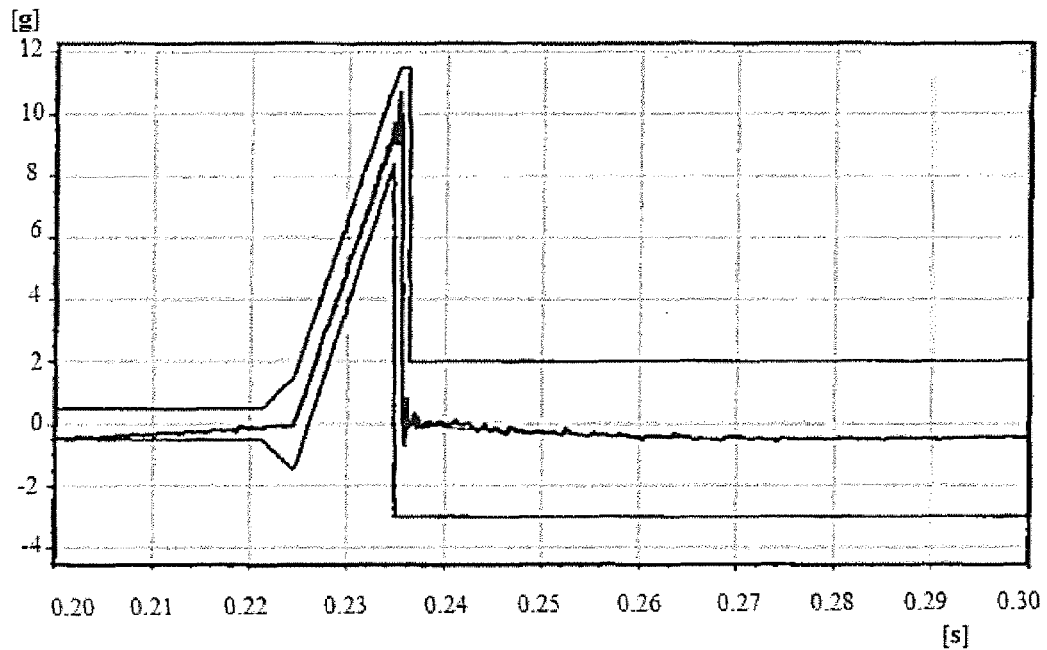
Figure 12a          Positive shocks along Y – Control axis
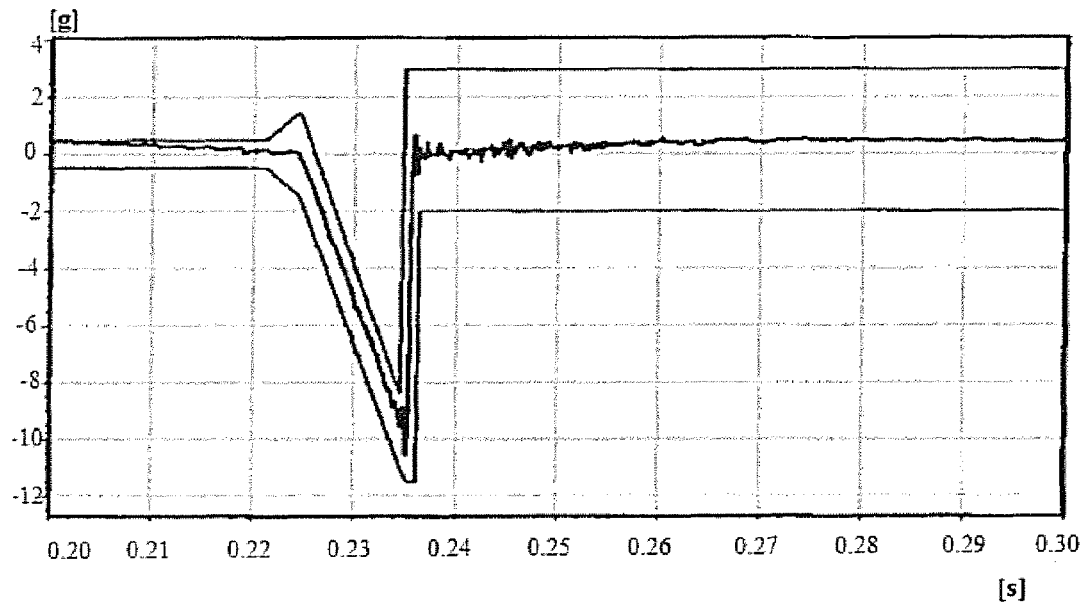
Figure 12b          Negative shocks along Y – Control signal

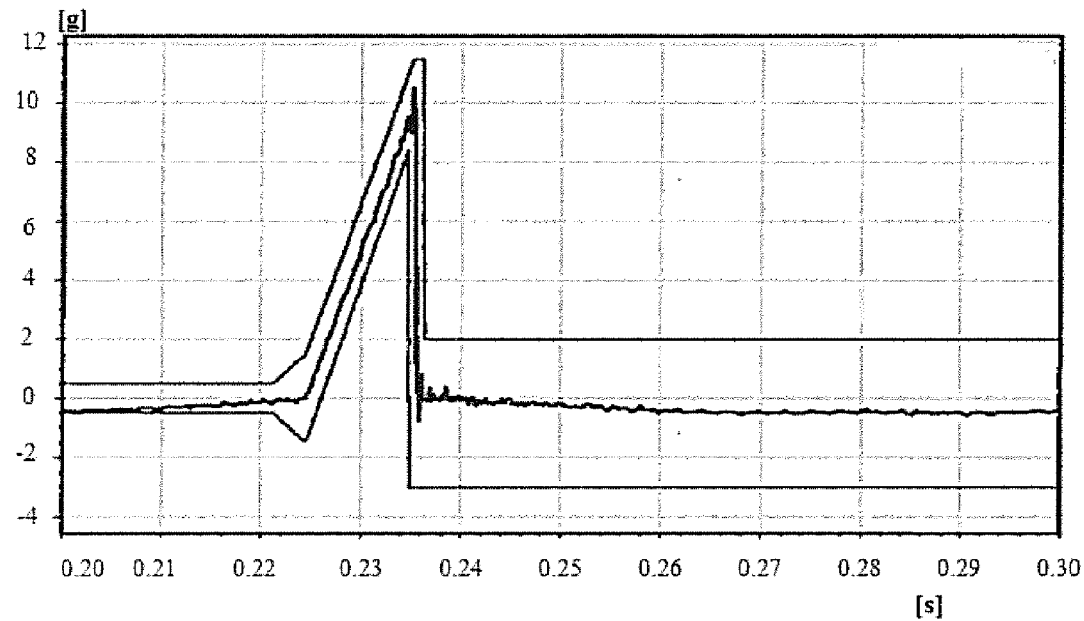
Figure 13a      Positive shocks along Z – Control signal
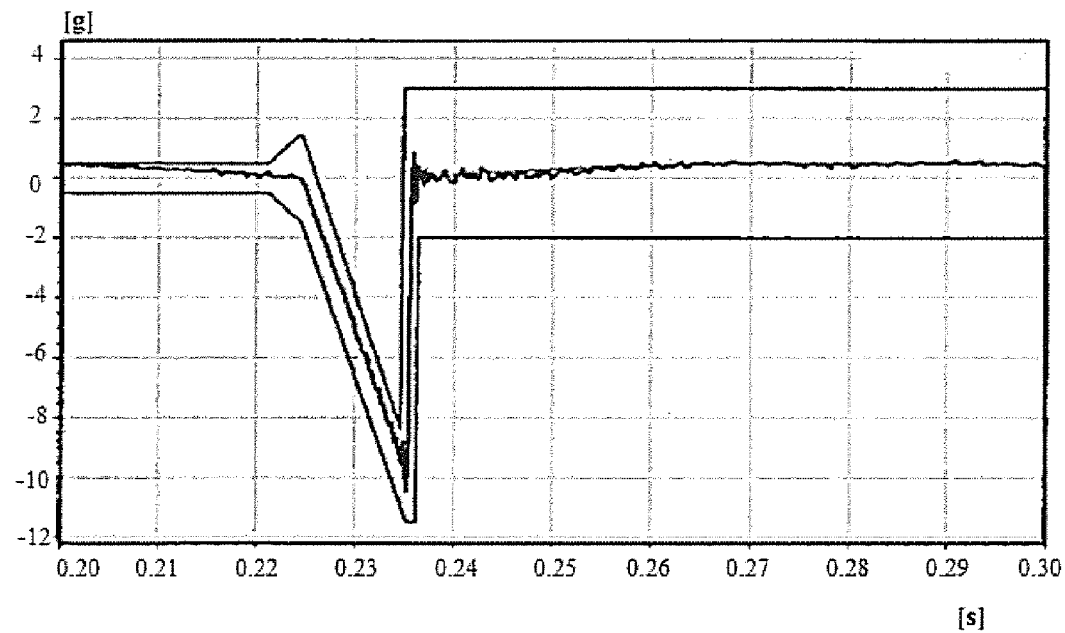
Figure 13b      Negative shocks along Z – Control signal

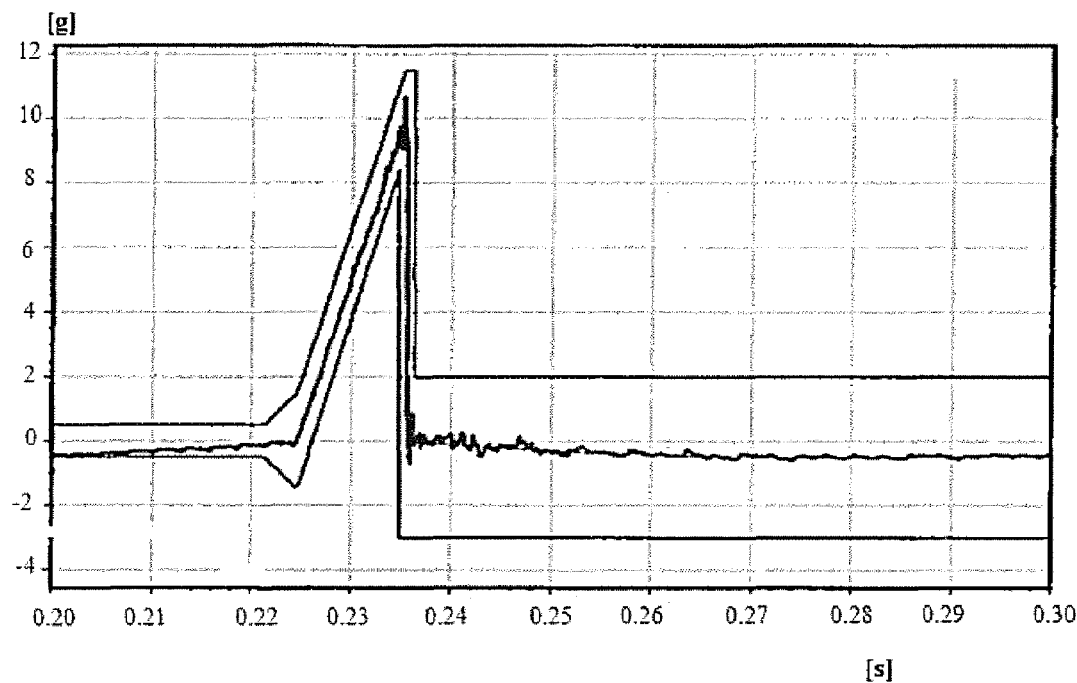
Figure 14a            Positive shocks along X – Control signal
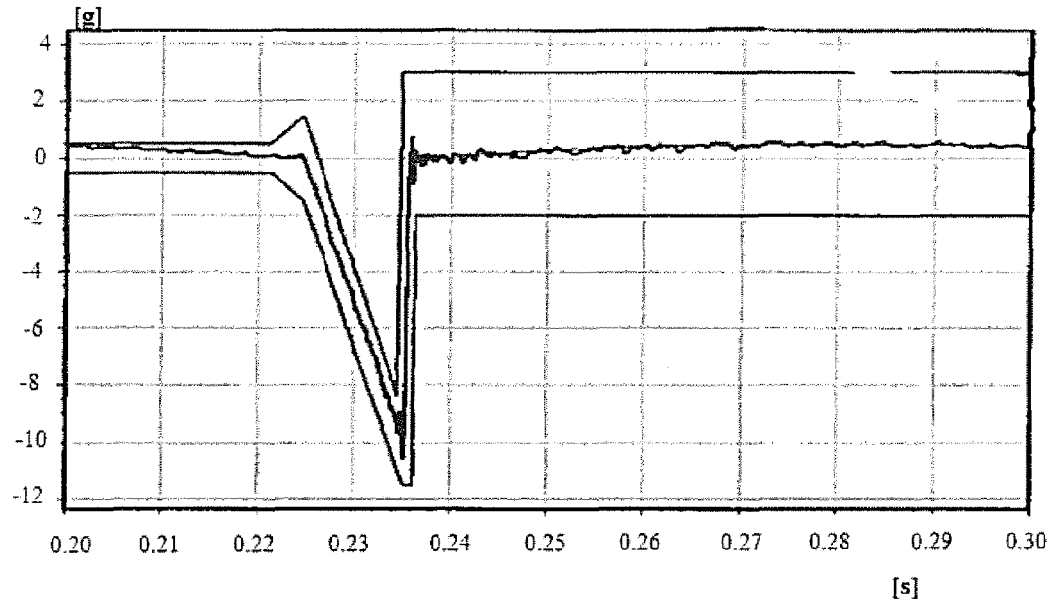
Figure 14b            Negative shocks along X – Control Signal

LOCOMOTIVE HEADLAMP

BACKGROUND OF THE INVENTION

1. Field of the Invention

The present disclosure relates generally to a lighting system, and, more particularly, to a locomotive headlamp.

2. Background of the Invention

Conventionally used headlamps for locomotive use have several drawbacks. One such drawback stems from the fact that conventionally used headlamps are recessed within the locomotive's headlight housing. Such a recessed position results in snow and ice impaction and accumulation between an anterior rim of the headlight and the wall of the locomotive's headlight housing.

Conventional halogen headlamps have the additional drawback in that, when in use on the locomotive, such headlamps may reach temperatures of up to about 140 degrees Celsius, thereby creating a hazardous burn condition.

Furthermore, conventionally used light emitting diode ("LED") headlamps for locomotive use generate heat which, based upon the recessed position of the LED headlamp within the locomotive's headlight housing, destroy the electronics and circuitry contained within the LED headlamp. Additionally, because conventionally used LED locomotive headlamps contain the heat generated from the LED bulbs in the back of the headlamp, such heat is insufficient for melting snow and ice accumulation from the headlamp when in use on the locomotive.

Another drawback to conventionally known locomotive headlamps is that, when in operation, they are exposed to vibrational shocks which subject the headlamps to increased internal fractures.

An additional drawback to conventionally known locomotive headlamps is that they are in need of regular replacement and maintenance. For example, conventionally used halogen-based headlamps last a maximum of only up to about 2,000 hours. Additionally, known headlamps have a high parasitic load, thereby causing the waste of fuel.

What is needed, therefore, is a locomotive headlamp that can generate heat which may be used to prevent the accumulation of snow and ice on the headlamp without causing harm to the electronics and/or circuitry contained within the headlamp. Further needed is a headlamp with improved resistance to the vibrational forces sustained by the headlamps when in use on the locomotive, and which have an improved life of operation and a reduced parasitic load.

BRIEF SUMMARY OF THE INVENTION

The above described deficiencies of the prior art are cured or alleviated by a headlamp capable of harnessing the heat generated from a light source of the headlamp, and which is further capable of using such heat to prevent the impact and the accumulation of snow and/or ice on the headlamp. In an exemplary embodiment, the headlamp comprises an upper portion and a lower portion. The upper portion comprises a light source, an upper housing, a plurality of fins, and a base. In an exemplary embodiment, the light source comprises one or more LED bulbs. The lower portion comprises a lower housing that contains at least a portion of the electronics and/or circuitry for operating from a locomotive's power source. When installed on a locomotive's headlight housing, the lower portion is positioned within a cavity formed within the locomotive's headlight housing, a portion of the base forms a seal with an interior-directed wall of a wall of the locomotive's headlight housing, and a portion of the base, the plurality of fins, and the upper housing is exposed to the ambient air such that the heat contained within the upper portion is vented away from the lower portion, thereby, preventing heat-caused damage to the electronics and/or circuitry contained in the lower housing.

Accordingly, the position of the locomotive headlamp, when installed within the locomotive's headlight housing, is such that the upper portion, which contains the heat-generating light source, protrudes away from the locomotive and is surrounded by ambient air. In this manner, the heat generated from the light source may be used through principles of heat transfer to prevent impaction of snow and ice around the headlamp.

A preferred light source comprises one or more LED bulbs as such bulbs dramatically reduce the parasitic load, reduce ongoing maintenance requirements typically encountered by halogen based bulbs, and reduce the safety risks inherent with the use of halogen bulbs. The inventive headlamp, while incorporating one or more LED bulbs as a light source, overcomes problems inherent with such use by preferably using military grade LED bulbs that may sustain higher operating temperatures. Additionally, the headlamp is configured such that the heat generated from the one or more LED bulbs is isolated from the circuitry and/or electronics used to power the one or more LED bulbs when the headlight is installed on the locomotive's headlight housing.

These and other features and advantages of the present invention will be more fully understood from a reading of the following detailed description with reference to the accompanying drawings.

BRIEF DESCRIPTION OF THE DRAWINGS

FIGS. 12a-14b depict results conducted to assess the headlamp's ability to sustain negative and positive shocks, wherein the headlamp is that depicted in FIG. 1.

DETAILED DESCRIPTION OF THE INVENTION

Figure 1:
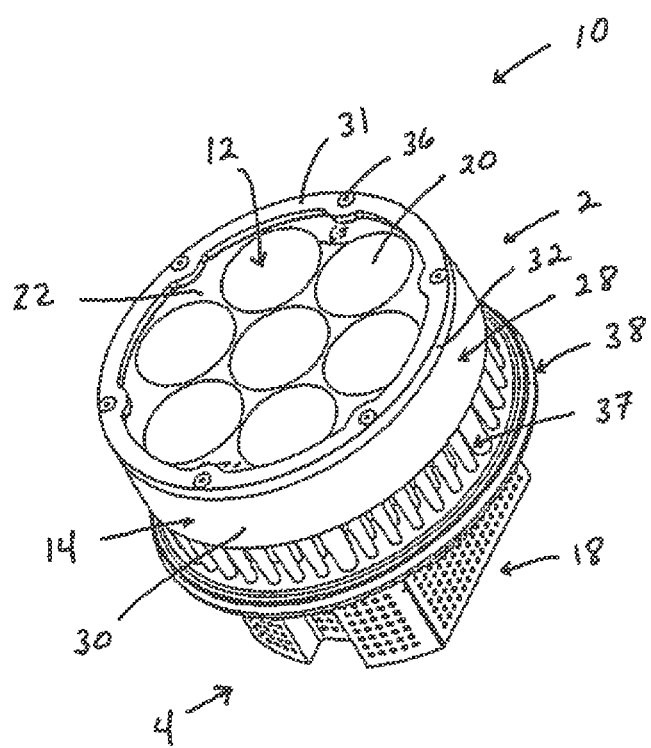
FIG. 1 is a schematic depicting a side elevational view of the top side of an exemplary headlamp.
Figure 2:
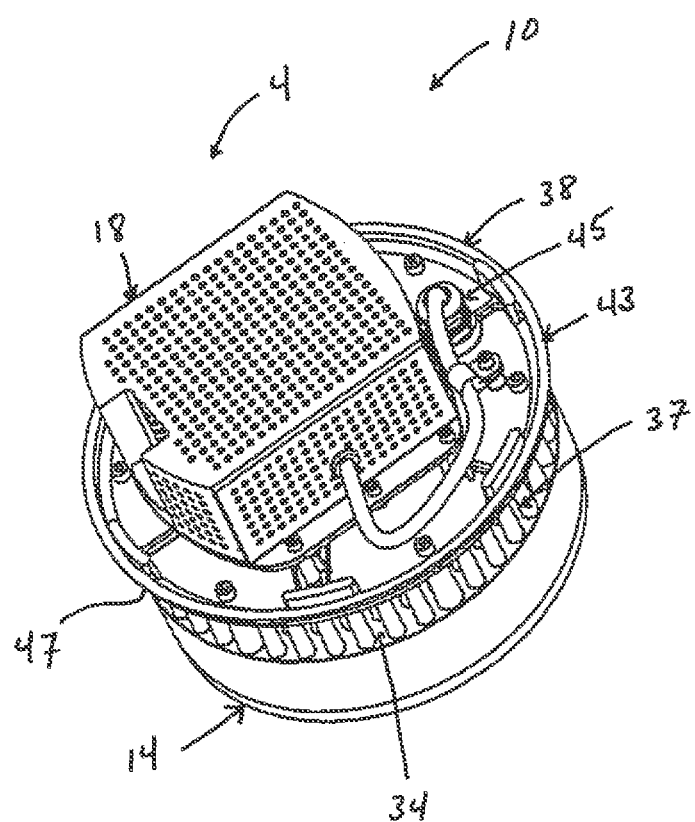
FIG. 2 is a schematic depicting a side elevational view of the bottom side of the headlamp depicted in FIG. 1.
Figure 3:
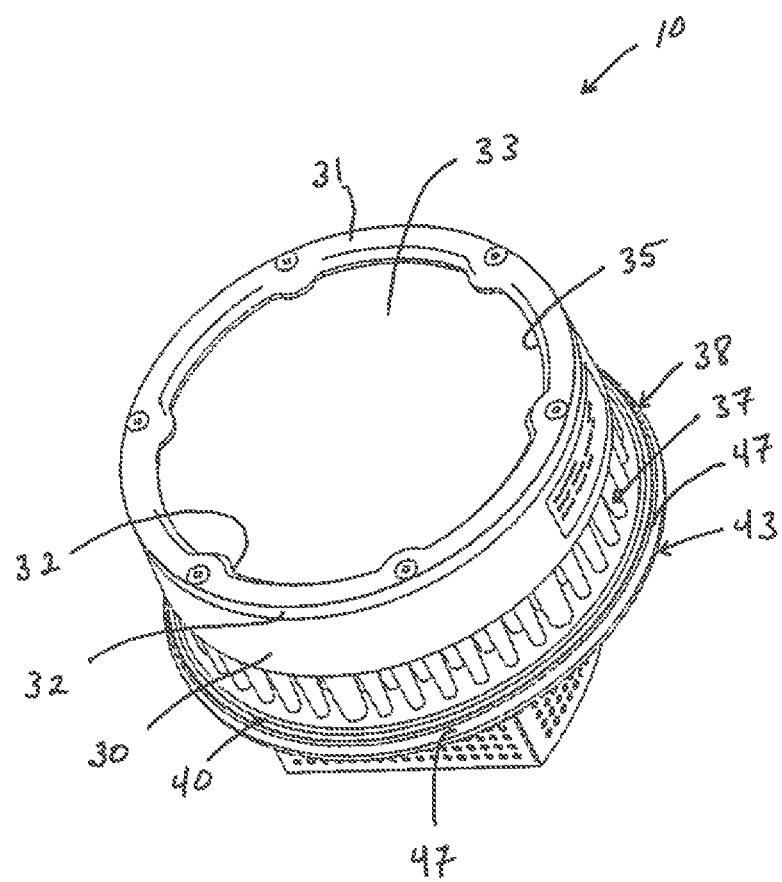
FIG. 3 is a schematic depicting the side elevational view of the top side of the headlamp depicted in FIG. 1 without the plate.
Figure 4:
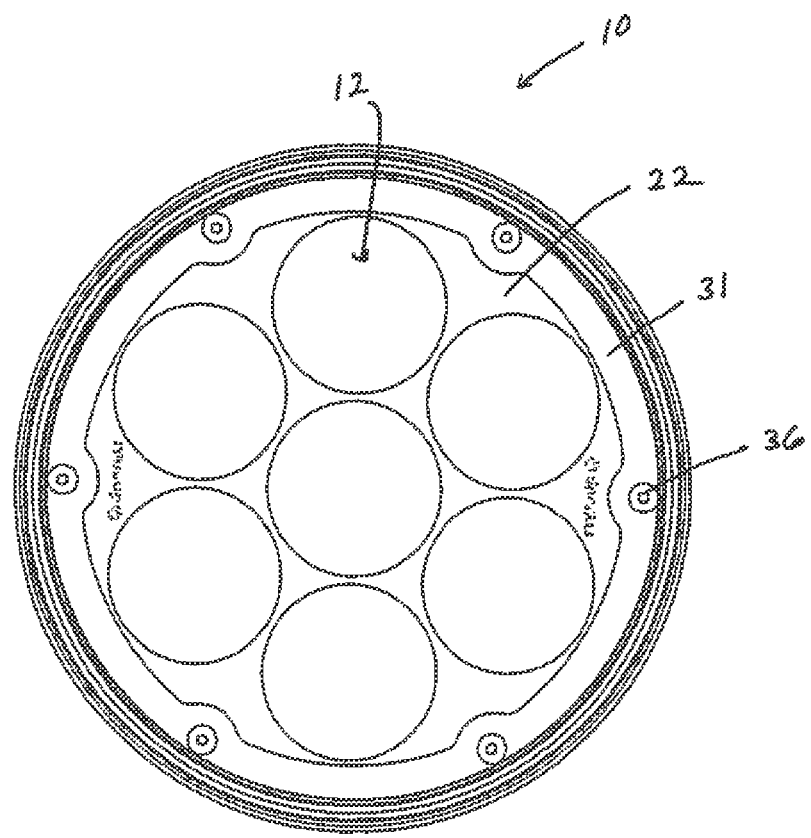
FIG. 4 is a schematic depicting a top elevational view of the headlamp depicted in FIG. 1.

The presently disclosed locomotive headlamp is specially designed to optimize the use of heat generated from a light source of the headlamp. In an exemplary embodiment, the headlamp comprises a lower portion and an upper portion.

The lower portion comprises at least a portion of the electronics and/or circuitry necessary to operate the light source when the headlamp is installed within a locomotive's headlight housing, and a lower housing for holding such electronics and/or circuitry.

The upper portion comprises the light source, an upper housing which holds the light source, a plurality of fins, and a base. The light source preferably comprises one or more LED bulbs. The use of one or more LED bulbs has demonstrated a reduction in the parasitic load of the locomotive of up to about 86 percent, thereby resulting in a significant savings in fuel costs. Additionally, LED bulbs require less maintenance as compared to conventionally used halogen bulbs, as the locomotive headlamp lasts over around 40,000 hours as compared to up to about 2,000 hours for halogen headlamps.

Also, each of the LED bulbs selected for use in the locomotive headlamp is selected to generate a sufficient amount of heat so as to prevent the formation of snow and ice impaction around the headlamp when installed on the locomotive's headlight housing and in use, and to ensure that the LED bulb can sustain itself when subject to the resulting operating temperatures. In an exemplary embodiment, the one or more LED bulbs generates a total wattage of up to about 50 Watts and can sustain operating temperatures of up to about 100 degrees Celsius.

The upper housing, the plurality of fins, and the base, as a result of the headlamp's configuration and placement within the locomotive's headlight housing, further serve to harness the heat generated from the light source, and to effectively use such heat, via the principles of heat transfer, to prevent the impaction of snow and ice around the headlamp when the headlamp is in use and installed within a locomotive's headlight housing. Additionally, the upper housing, the plurality of fins, and the base serve as a heat sink to prevent the heat generated by the light source from damaging the electronics and/or circuitry contained within the lower housing.

When in use and installed within the locomotive's headlight housing, the design of the upper portion is such that the base fixes firmly into the headlight to form a seal. Furthermore, when so properly installed, a majority of the upper portion is exposed to the ambient air while the lower housing is contained within the locomotive's headlight housing. Accordingly, the upper portion protrudes away from the locomotive and is exposed to the ambient air, while the lower portion is contained within the locomotive's headlight housing.

To most effectively generate and harness the heat with the aim of removing and/or preventing impaction of snow and ice around the headlamp without causing harm to the electronics and/or circuitry contained within the lower housing, the upper portion protrudes away from the locomotive from about inch to up to about 10 inches as calculated from an upper portion of the base to a top side of an anterior rim of the headlamp. Such a protrusion is distinct from the prior art in which the uppermost portion of the headlamp is either flush with, or recessed into, the locomotive's headlight housing, thereby promoting the accumulation of snow around the edges between the headlight housing and the headlamp. Furthermore, the upper housing, the plurality of fins, and the base may be formed from a wide variety of materials, wherein such materials are selected to confer a sufficient degree of durability, yet which are light enough such that the headlamp can function in a heat conductive manner and such that the headlamp is less likely to damage the locomotive fixtures that the headlamp is used in while the headlamp is being subjected to intense vibrations in the operating field. An exemplary material comprises aluminum.

Additionally, where the headlamp is to be installed on a diesel locomotive manufactured by, e.g., the General Motors Electro-Motive Division or the Electro-Motive Diesel, the upper housing preferably has an outer diameter of about 6.25 inches, an interior diameter of about 5 and $5/8^{th}$ inches, and a height of about 2.5 inches to about 3.5 inches. In this embodiment, the base preferably has an outer diameter of about 7 inches. Furthermore, in this exemplary embodiment, the plurality of fins preferably comprises fins which are radially and symmetrically arranged relative to the upper housing and the lower housing.

Preferred embodiments of the present disclosure will be described hereinbelow with reference to the accompanying drawings. In the following description, well-known functions or constructions are not described in detail to avoid obscuring the invention in unnecessary detail. Throughout the drawings, like reference numerals represent like elements.

Referring to FIGS. 1-6, an exemplary headlamp 10 comprises an upper portion 2 and a lower portion 4. Upper portion 2 comprises a light source 12, an upper housing 14, a plurality of fins 37, and a base 38; while lower portion 4 comprises a lower housing 18 and electronics and/or circuitry 45.

Light source 12 comprises a plurality of LED bulbs 20 arranged over and secured to a substantially circular-shaped plate 22. Each of the LED bulbs from plurality 20 is disposed through plate 22 and extends into a chamber 33 formed in upper housing 14. The LED bulbs may be selected from those that are conventionally known and used in the industry, where a particularly preferred LED bulb is of a military grade, and, which, therefore, can functionally operate at temperatures that reach up to about 100 degrees Celsius.

Upper housing 14 comprises a generally cylindrical shaped collar 28. Collar 28 has a side wall 30 which turns perpendicularly inward at an anterior terminal end thereof to form a top wall 32, and which turns perpendicularly inward at a posterior terminal end thereof to form a bottom wall 34. A generally circular shaped opening 35 is formed through top wall 32 and leads into chamber 33 formed in upper housing 14.

Upper housing 14 further comprises a generally cylindrically shaped anterior rim 31 that is disposed on top wall 32 and secured thereto via a plurality of screws 36. Anterior rim 31 comprises an opening such that plurality of LED bulbs 20 is exposed. Anterior rim 31 is preferably weather sealed.

Base 38 comprises a substantially cylindrical shaped body having an anterior-directed portion 40 concentrically arranged with a posterior-directed portion 43, wherein anterior-directed portion 40 is recessed relative to posterior-directed portion 43 to form a base rim 47.

A portion of the fins from plurality 37 are attached to and extend from bottom wall 34 of collar 28 at one end thereof and extend from and attach to anterior-directed portion 40 of body 39 of base 38 at an oppositely situated end thereof. Another portion of the fins from plurality 37 are cast/poured metal such that such portion is integrally formed with collar 28 and extend from bottom wall 34 of collar 28. Such portion of fins preferably do not actually touch base 38.

Lower housing 18 is fixedly attached to base 38. Lower housing 18 contains and/or holds at least a portion of electronics and/or circuitry 45 essential for operation of plurality of LED bulbs 20, wherein electronics and/or circuitry 45 are in electrical communication with the locomotive's power supply and plurality of LED bulbs 20.

Figure 8:
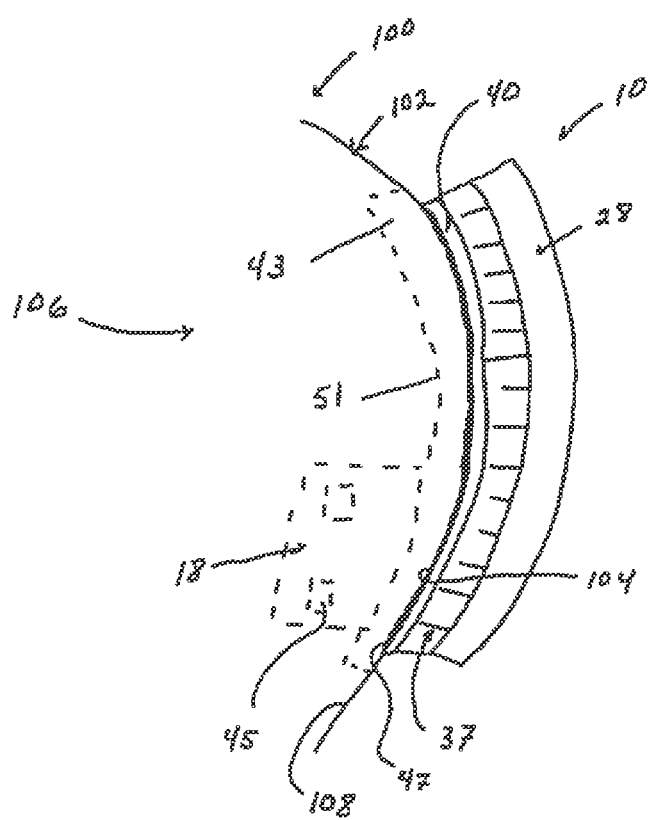
FIG. 8 is a schematic depicting the headlamp depicted in FIG. 1 installed with an exemplary locomotive headlight housing.
Figure 9:
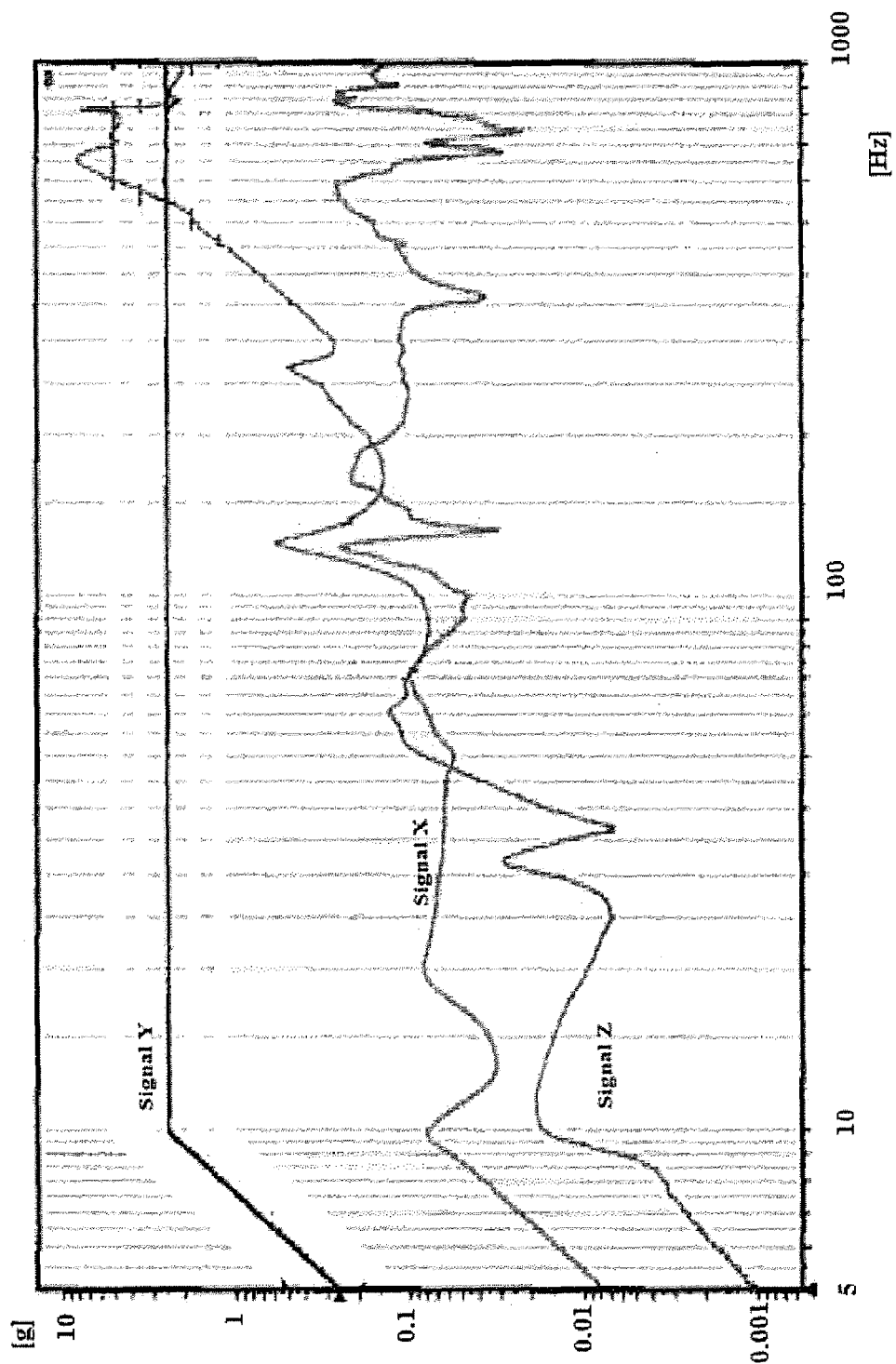
FIGS. 9-11 depict results conducted to assess the headlamp's ability to sustain vibrational forces, wherein the headlamp is that depicted in FIG. 1.
Figure 10:
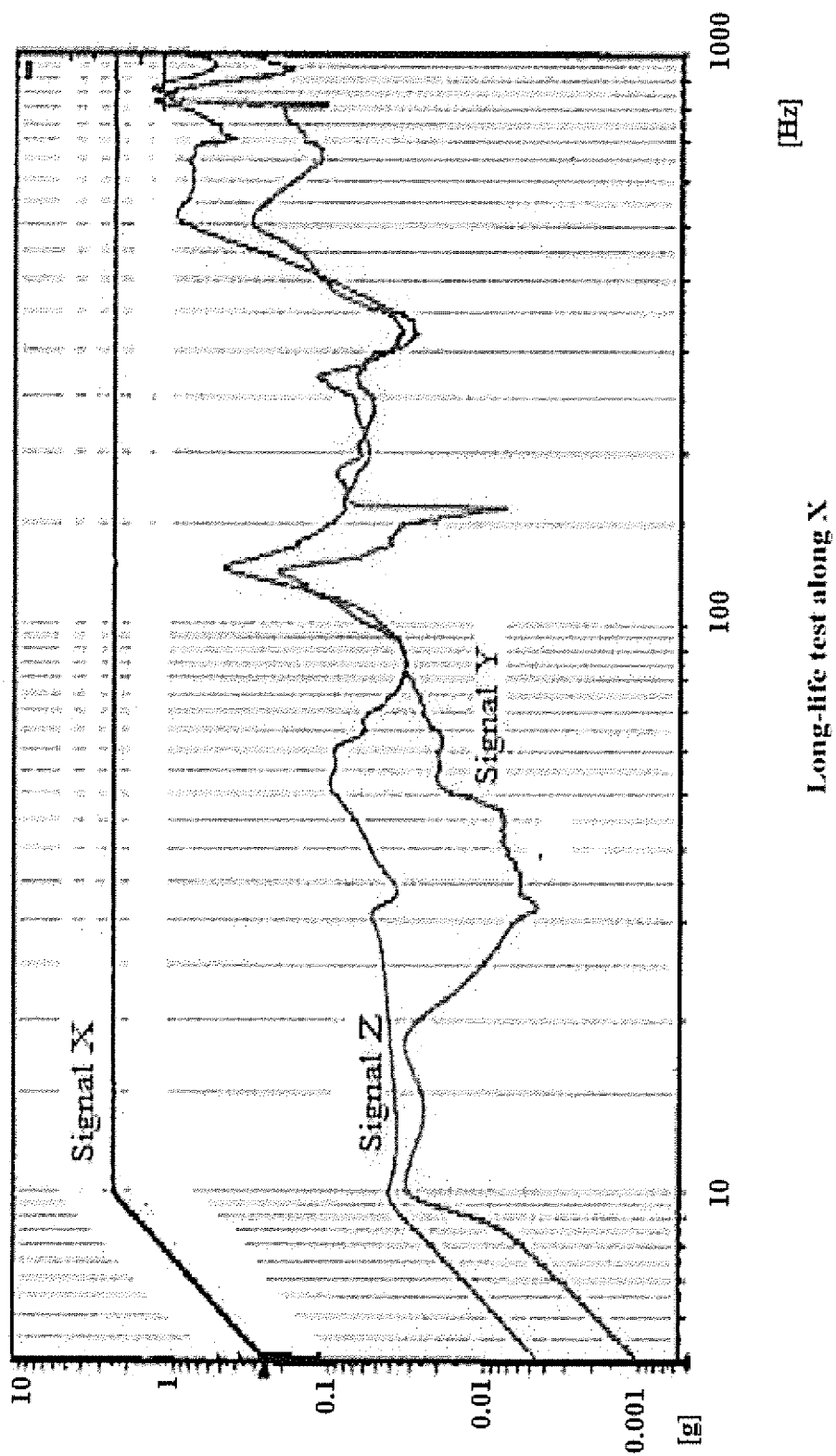
Figure 11:
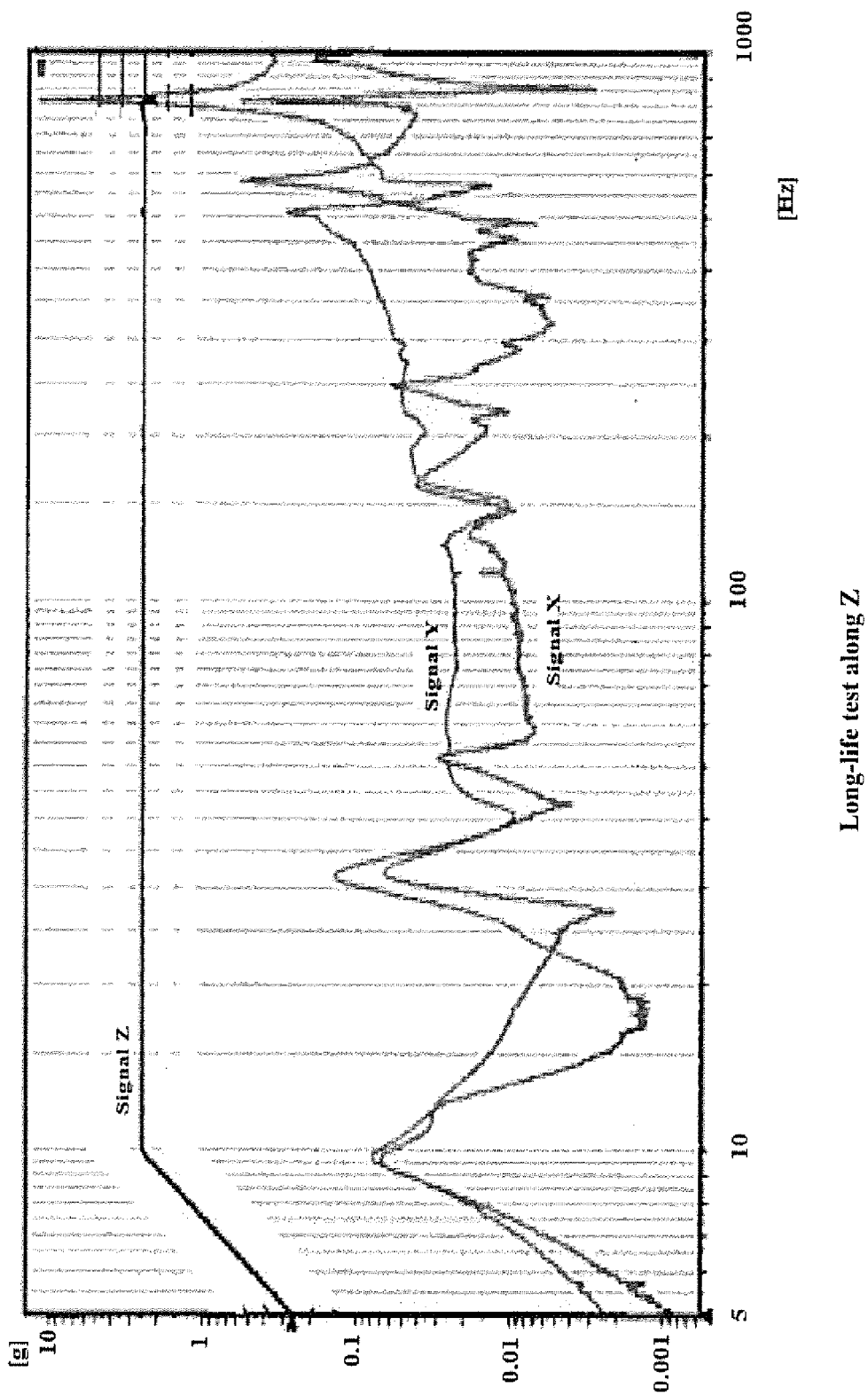

FIG. 8 depicts an exemplary arrangement of headlamp 10 in a locomotive's headlight housing 100. As shown in FIG. 8, headlight housing 100 comprises a wall 102 having an opening 104 formed therethrough which leads into a cavity 106. Lower housing 18 and posterior-directed portion 43 of base 38 are positioned within cavity 106 such that posterior-directed portion 43 and base rim 47 press against an interior directed side 108 of wall 102 to make a seal, while anterior-directed portion 40, plurality of fins 37, and collar 28 are directed away from headlight housing 100 and exposed to the ambient air.

In addition in optimally utilizing the heat generated by the light source of the headlamp, the design of the headlamp has been found to have improved sustainability to the vibrational forces to which locomotive headlamps are typically exposed when in operation. This enhanced feature of the headlamp is demonstrated by way of vibration and shock tests, as set forth below.

The equipment used during the vibration and shock tests is set forth below in Table 1.

TABLE 1

| Equipment | Manufacturer; Model | Serial No. |
| --- | --- | --- |
| Shaker table | UDC; T1000-20 | 350 |
| Vibration controller | M + p International, VIBEXEC | U.S. 45/003,755 |
| Triaxial accelerometer | PCB: 354C03 | 6447 |

The tests were performed in the sequence below for each of the 3 axes: (a) vibration testing; and (b) shock testing. The tests were first made along the longitudinal axis, then along the transverse axis, and then along the vertical axis.

Sinusoidal Vibrations

The object of the vibration test was to assess the capacity of the headlamp to perform normally after being subjected to a prolonged period of vibration levels that are likely to occur in the headlamp's normal usage environment.

The test was performed in compliance with specifications set forth in Table 2.

TABLE 2

| | |
| --- | --- |
| Test Conditions | The headlamp was installed by mounting the headlamp using its normal fixing points to a vertical plane of a right-angled anchoring structure. The structure itself was bolted onto a shaker table to simulate the headlamp's normal installation. The test axes corresponded to the locomotive's axes; i.e., the transverse axis corresponded to the width of the train, the longitudinal axis corresponded to the train's length, and the vertical axis corresponded to the train's height, |
| Frequency Range | 5 to 1,000 Hz |
| Displacement/ Acceleration | 5-10 Hz: 2.5 mm peak; 10 to 1,000 Hz: 2.5 g peak |
| Sweep Rate | 1 octave/minute |
| Duration of Test | 4:04:45 per axis (16 sweeps to and fro) |
| Axes | 3 orthogonal axes |
| Control | The vibration level was controlled by a single accelerometer located on the anchoring structure under the headlamp |
| Measurements | The vibration levels along the 2 transverse axes were measured by the triaxial accelerometers used for control |

Figure 5:
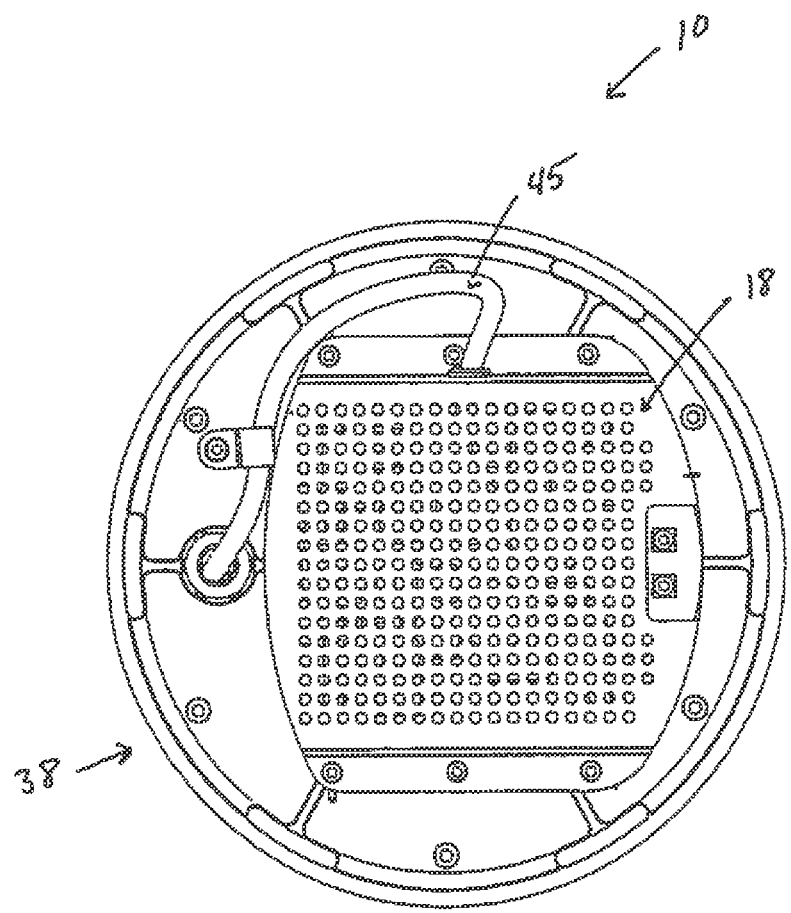
FIG. 5 is a schematic depicting a bottom elevational view of the headlamp depicted in FIG. 1.
Figure 6:
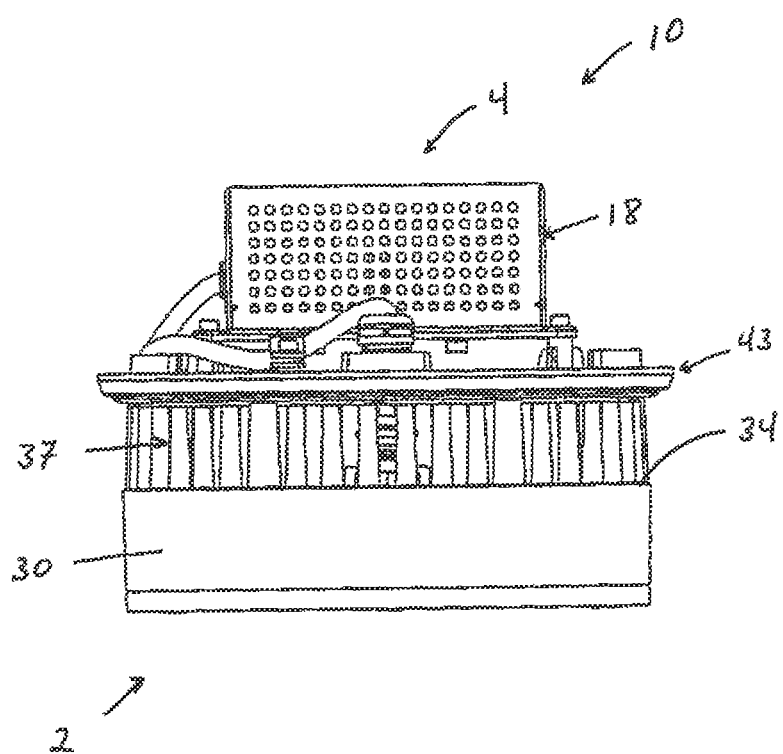
FIG. 6 is a schematic depicting a proximal side view of the headlamp depicted in FIG. 1.
Figure 7:
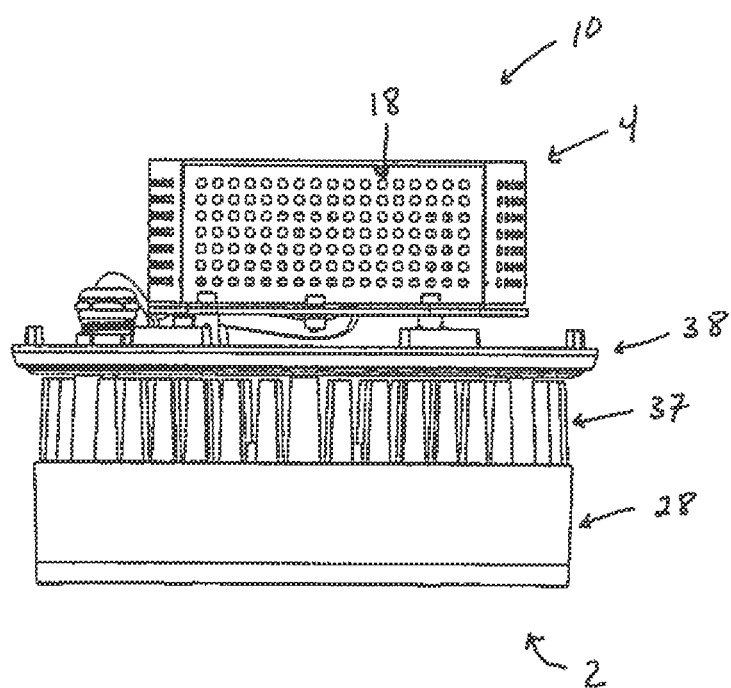
FIG. 7 is a schematic depicting a distal side view of the headlamp depicted in FIG. 1.

The charts of the acceleration levels resulting from the tests in each of the 3 axes are presented in FIGS. 5-7. In these figures, the blue lines represent tolerance limits, while the red lines represent abort limits. The results obtained from this testing is depicted below in Table 3, wherein the test number ("Test No.") indicates the sequence in which the tests were performed (see also Table 5 for complete listing of test sequence order).

TABLE 3

| Test axis | Test No. | Results |
| --- | --- | --- |
| Y axis, longitudinal | 1 | No apparent damage; normal operation after the test. |
| X axis, transverse | 3 | No apparent damage; normal operation after the test. |
| Z axis, vertical | 5 | No apparent damage; normal operation after the test. |

Shock Testing

The object of the shock test was to assess the capacity of the headlamp to perform normally after being subjected to shocks that are likely to occur in its normal usage environment.

The test was performed in compliance with specifications set forth in Table 4.

TABLE 4

| | |
| --- | --- |
| Test Conditions | The headlamp was installed by mounting the headlamp using its normal fixing points to a vertical plane of a right-angled anchoring structure. The structure itself was bolted onto a shaker table to simulate the headlamp's normal installation. The test axes corresponded to the locomotive's axes; i.e., the transverse axis corresponded to the width of the train, the longitudinal axis corresponded to the train's length, and the vertical axis corresponded to the train's height. |
| Pulse Shape | Sawtooth |
| Peak Acceleration | 10 g |
| Nominal Duration | 11 ms |
| Number of Shocks | 3 positive and 3 negative shocks per axis (18 shocks total) |
| Axis/Axes | 3 orthogonal axes |
| Control | The vibration level was controlled by a single accelerometer located on the anchoring structure under the headlamp |

Along each axis, the operation of the headlamp was verified at the beginning and at the end of the series of 6 shocks. The results obtained from this testing is depicted below in Table 5.

TABLE 5

| Test axis | Test No. | Results |
| --- | --- | --- |
| Y axis, longitudinal | 2 | No apparent damage; normal operation after the test. |
| X axis, transverse | 4 | No apparent damage; normal operation after the test. |
| Z axis, vertical | 6 | No apparent damage; normal operation after the test. |

The acceleration levels resulting from the shock tests are presented in FIGS. 8a-10b. The blue lines represent the tolerance limits. No faults or apparent signs of damage caused by the shocks were noted after any of the shock tests, and the operation of the headlamp was normal before and after the test along each axis.

In addition to providing a reliable and functional headlamp, the locomotive headlamp disclosed herein has additional benefits. For example, the locomotive headlamp consumes approximately 50 watts compared to the approximately 350 watts consumed by a traditional halogen headlamp. This efficient energy consumption by the locomotive headlamp has the potential to save consumers more than $700.00 (US dollars) in diesel fuel each year per headlamp assuming that the headlamp runs on average about 8 hours per day.

Additionally, the locomotive headlight disclosed herein meets and complies with Title 49 CFR Part 229.125 which requires a minimum of 200,000 candela at center beam. Additionally, it gives users 2 times the brightness required at 7.5 degrees off center, increasing track visibility. Additionally, the beam cut off is at about 20 degrees to limit light pollution and side glare.

While the disclosure has been shown and described with reference to certain preferred embodiments thereof, it will be understood by those skilled in the art that various changes in form and detail may be made therein without departing from the spirit and scope of the disclosure.

What is claimed is:

1. A headlight for installation with a headlight housing of a locomotive, wherein the headlight comprises:
    an upper portion, comprising:
        an upper housing having a generally cylindrical shaped collar having an exterior side wall oppositely situated to an interior side wall, a top wall oppositely situated to a bottom wall, wherein the top and bottom walls are transversely positioned relative to the exterior and interior side walls; and a chamber surrounded by the interior side wall;
        a light source disposed within the chamber of the upper housing;
        a base having an anterior directed portion oppositely situated to a posterior directed portion, wherein the anterior directed portion is concentrically joined to and recessed relative to the posterior directed portion to form a base rim which is disposed between the anterior and posterior directed portions; and
        a plurality of fins sandwiched between the upper housing and the base and radially positioned on the bottom wall of the upper housing and extending towards the base; and
    a lower housing directed towards the posterior directed portion of the base and opposite from the upper housing; and
    circuitry contained within the lower housing, and which is in electrical communication with the light source and with a power source provided by the locomotive;
wherein, when the headlight is installed on the headlight housing of the locomotive, the lower housing and the posterior directed portion of the base are contained within a cavity of the headlight housing of the locomotive, the base rim forms a seal between the locomotive headlight and an interior directed side of a wall of the headlight housing, and wherein the anterior directed portion of the base, the plurality of fins, and the upper housing protrude from and are raised relative to the interior directed side of the wall of the headlight housing.

2. The headlight of claim 1, wherein the light source comprises a plurality of light emitting diodes.

3. The headlight of claim 2, wherein the upper portion further comprises a plate disposed within the chamber, wherein the plate has a plurality of openings formed therein, and wherein the plurality of light emitting diodes is received by the plurality of openings.

4. The headlight of claim 3, wherein the plate is secured to the top wall of the collar of the upper housing.

5. The headlight of claim 4, further comprising an anterior rim disposed on the top wall of the collar of the upper housing, wherein the anterior rim has a generally annular-shaped body having an opening centrally formed therethrough, wherein the opening is aligned with the chamber of the upper housing.

6. The headlight of claim 4, wherein the plurality of fins is integrally formed with the bottom wall of the upper housing.

7. The headlight of claim 6, wherein a portion of the plurality of fins is further disposed on the anterior directed portion of the base.

8. A locomotive headlight assembly, comprising:
    a locomotive headlight housing, comprising:
        a wall having an exterior directed side and an interior directed side;
        an opening formed through the interior and exterior directed sides of the wall; and
        a cavity in fluid communication with the opening and directed towards the interior directed side of the wall; and
    a headlight, comprising:
        an upper portion, comprising:
            an upper housing having a generally cylindrical shaped collar having an exterior side wall oppositely situated to an interior side wall, a top wall oppositely situated to a bottom wall, wherein the top and bottom walls are transversely positioned relative to the exterior and interior side walls; and a chamber surrounded by the interior side wall;
            a light source disposed within the chamber of the upper housing;
            a base having an anterior directed portion oppositely situated to a posterior directed portion, wherein the anterior directed portion is concentrically joined to and recessed relative to the posterior directed portion to form a base rim which is disposed between the anterior and posterior directed portions; and
            a plurality of fins radially positioned on the bottom wall of the upper housing and extending towards the base; and
        a lower housing directed towards the posterior directed portion of the base and opposite from the upper housing; and
        circuitry contained within the lower housing, and which is in electrical communication with the light source and with a power source provided by the locomotive;
    wherein, the lower housing and the posterior directed portion of the base of the headlight are contained within the cavity of the headlight housing, the base rim forms a seal between the locomotive headlight and the interior directed side of the wall of the locomotive headlight housing, and the anterior directed portion of the base, the plurality of fins, and the upper housing protrude from and are raised relative to the exterior directed side of the wall of the headlight housing in a direction opposite to the interior directed side of the wall.

9. The headlight of claim 8, wherein the light source comprises a plurality of light emitting diodes.

10. The headlight of claim 9, wherein the upper portion further comprises a plate disposed within the chamber, wherein the plate has a plurality of openings formed therein, and wherein the plurality of light emitting diodes is received by the plurality of openings.

11. The headlight of claim 10, wherein the plate is secured to the top wall of the collar of the upper housing.

12. The headlight of claim 11, further comprising an anterior rim disposed on the top wall of the collar of the upper housing, wherein the anterior rim has a generally annular-shaped body having an opening centrally formed therethrough, wherein the opening is aligned with the chamber of the upper housing.

13. The headlight of claim 12, wherein the plurality of fins is integrally formed with the bottom wall of the upper housing.

14. The headlight of claim 13, wherein a portion of the plurality of fins is further disposed on the anterior directed portion of the base.

\* \* \* \* \*